United States Patent
Lee

(10) Patent No.: US 10,649,937 B2
(45) Date of Patent: May 12, 2020

(54) UNIVERSAL ASYNCHRONOUS RECEIVER/TRANSMITTER UNIT, AND MEMORY CONTROLLER AND MEMORY SYSTEM INCLUDING THE SAME

(71) Applicant: SK hynix Inc., Icheon (KR)

(72) Inventor: Dong Sop Lee, Yongin (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/017,053

(22) Filed: Jun. 25, 2018

(65) Prior Publication Data

US 2019/0138476 A1 May 9, 2019

(30) Foreign Application Priority Data

Nov. 7, 2017 (KR) .......................... 10-2017-0147409

(51) Int. Cl.
G06F 13/38 (2006.01)
G06F 13/42 (2006.01)
G06F 12/02 (2006.01)
G06F 9/30 (2018.01)
G06F 40/157 (2020.01)

(52) U.S. Cl.
CPC ........ *G06F 13/385* (2013.01); *G06F 9/30145* (2013.01); *G06F 12/0246* (2013.01); *G06F 13/4282* (2013.01); *G06F 40/157* (2020.01)

(58) Field of Classification Search
CPC ............. G06F 9/30145; G06F 12/0246; G06F 17/2276; G06F 13/4282; G06F 13/385
See application file for complete search history.

(56) References Cited

U.S. PATENT DOCUMENTS

| 4,701,746 A * | 10/1987 | Ueda ........................ H03H 7/00 341/106 |
| 6,847,615 B1 * | 1/2005 | Walter ................ H04L 25/0262 370/252 |
| 7,296,187 B1 | 11/2007 | Fritz et al. |
| 7,330,137 B2 * | 2/2008 | Liu ........................ H03M 5/145 341/50 |
| 2003/0141996 A1 * | 7/2003 | Schouhamer Immink ................... G11B 20/1426 341/59 |

(Continued)

FOREIGN PATENT DOCUMENTS

KR 10-1257041 B1 4/2013

*Primary Examiner* — Tim T Vo
*Assistant Examiner* — Phong H Dang

(57) ABSTRACT

There are provided a universal asynchronous receiver/transmitter (UART) unit, and a memory controller and a memory system, which have the UART unit. A UART unit includes: a WORD table to store text information and a plurality of word codes corresponding to the text information, and to output a first word code corresponding to first text information when the first text information is received by the WORD table, wherein the text information includes a plurality of words, and the first text information includes a first word among the plurality of words; a UART controller to output the first text information to the WORD table by extracting the first word from output information, and to output an output code based on the output information and the first word code when the first word code is received from the WORD table; and a UART to output debugging information based on the output code.

16 Claims, 6 Drawing Sheets

(56) References Cited

U.S. PATENT DOCUMENTS

| | | | |
|---|---|---|---|
| 2006/0235916 A1* | 10/2006 | Schouhamer Immink | .................. G11B 20/1426 708/210 |
| 2011/0273972 A1* | 11/2011 | Higashino | .......... G11B 7/24044 369/47.15 |
| 2012/0246387 A1* | 9/2012 | Kanno | ................ G06F 11/1016 711/103 |
| 2016/0357651 A1* | 12/2016 | Huang | .................. G06F 11/221 |
| 2017/0132067 A1* | 5/2017 | Singaravelu Vanaja | ..................... G06F 11/0778 |

* cited by examiner

FIG. 4

WORD Table  72

| WORD | W Code |
|---|---|
| FOR | 01 |
| OF | 02 |
| IN | 03 |
| DO | 04 |
| LBA | 05 |
| PBA | 06 |
| TRY | 07 |
| ... | ... |
| NAND-CH3-DIE1 | 26 |
| NAND-CH3-DIE2 | 27 |
| NAND-CH3-DIE3 | 28 |

UNIVERSAL ASYNCHRONOUS RECEIVER/TRANSMITTER UNIT, AND MEMORY CONTROLLER AND MEMORY SYSTEM INCLUDING THE SAME

CROSS-REFERENCE TO RELATED APPLICATION

The present application claims priority under 35 U.S.C. § 119(a) to Korean patent application number 10-2017-0147409 filed on Nov. 7, 2017, the entire disclosure of which is incorporated herein by reference.

BACKGROUND

Field of Invention

Embodiments of the present disclosure relate to a universal asynchronous receiver/transmitter (UART) unit, as well as to a memory controller and a memory system, which include the UART unit, and more particularly, to a UART unit capable of improving the communication speed of a UART, and a memory controller and a memory system that include the UART unit.

Description of Related Art

A memory system may include a memory device and a memory controller.

The memory device may store data or output the stored data. For example, the memory device may be configured with volatile memory devices in which stored data is extinguished when power supply is interrupted, or may be configured with nonvolatile memory devices in which stored data is retained even when power supply is interrupted.

The memory controller may control data communication between a host and the memory device.

The host may communicate with the memory device through the memory controller by using an interface protocol such as peripheral component interconnect-express (PCI-E), advanced technology attachment (ATA), serial ATA (SATA), parallel ATA (PATA), or serial attached SCSI (SAS). Interface protocols between the host and the memory system are not limited to the above-described examples, and may include any of various interface protocols such as a universal serial bus (USB), a multi-media card (MMC), an enhanced small disk interface (ESDI), integrated drive electronics (IDE), and so on.

SUMMARY

Embodiments of the present disclosure provide a universal asynchronous receiver/transmitter (UART) unit capable of improving the operation speed of a UART, as well as a memory controller and a memory system, which include the UART unit.

According to an aspect of the present disclosure, there is provided a UART unit including: a WORD table configured to store text information and a plurality of word codes corresponding to the text information, and to output a first word code corresponding to first text information when the first text information is received by the WORD table, wherein the text information includes a plurality of words, and the first text information includes a first word among the plurality of words; a UART controller configured to output the first text information to the WORD table by extracting the first word from output information, and to output an output code based on the output information and the first word code when the first word code is received from the WORD table; and a UART configured to output debugging information based on the output code.

According to an aspect of the present disclosure, there is provided a memory controller including: a host interface configured to receive an output command from a host; a flash translation layer (FTL) configured to provide output information in response to the output command; and a UART unit configured to store word codes respectively corresponding to a plurality of words, and to output debugging information using first word codes corresponding to words included in the output information among the stored word codes.

According to an aspect of the present disclosure, there is provided a memory system including: a memory device configured to store data; and a memory controller configured to control the memory device in response to a request of a host, and to output debugging information of output information in response to an output command received from the host, wherein the memory controller includes text information and word codes corresponding to the text information, and outputs the debugging information by replacing words included in the output information with corresponding word codes in response to the output command.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present between the two elements. Like reference numerals refer to like elements throughout.

FIG. 4 is a diagram illustrating a WORD table of FIG. 3 according to an embodiment of the present disclosure.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the other element or be indirectly connected or coupled to the other element with one or more intervening elements interposed therebetween. In addition, when an element is referred to as "including" a component, this indicates that the element may further include another component, unless the disclosure provides otherwise.

Figure 1:
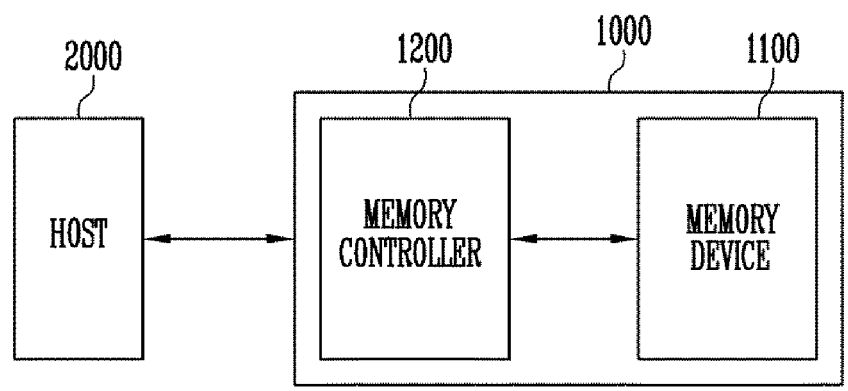
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a memory device 1100 that stores data, and a memory controller 1200 that controls the memory device 1100 under the control of a host 2000.

The memory device 1100 may include one or more of a double data rate synchronous dynamic random access memory (DDR SDRAM), a low power double data rate 4 (LPDDR4) SDRAM, a graphics double data rate (GDDR) SDRAM, a low power double data rate (LPDDR) SDRAM, a Rambus dynamic random access memory (RDRAM), a flash memory, and so on. The memory device 1100 may perform a program, read, or erase operation under the control of the memory controller 1200.

The memory controller 1200 may control overall operations of the memory system 1000, and control data exchange between the host 2000 and the memory device 1100. For example, the memory controller 1200 may convert received information, and store and output the converted information, such that commands, addresses, and data can be transmitted between the host 2000 and the memory device 1100.

The host 2000 may communicate with the memory system 1000 by using an interface protocol such as peripheral component interconnect-express (PCI-E), advanced technology attachment (ATA), serial ATA (SATA), parallel ATA (PATA), serial attached SCSI (SAS), or a combination thereof. Interface protocols used for the communication between the host 2000 and the memory system 1000 are not limited to the above-described examples, and may further include a serial interface, such as a universal asynchronous receiver/transmitter (UART), a universal serial bus (USB), a standard file input/output I/F, a multi-media card (MMC), an enhanced small disk interface (ESDI), integrated drive electronics (IDE), etc.

The host 2000 may be implemented with any of a personal computer PC, a laptop computer, a mobile phone, a smartphone, a tablet PC, a personal digital assistant (PDA), an enterprise digital assistant (EDA), a digital camera, a portable multimedia player (PMP), a portable navigation device (PND), an MP3 player, an electronic book (e-book), etc.

Figure 2:
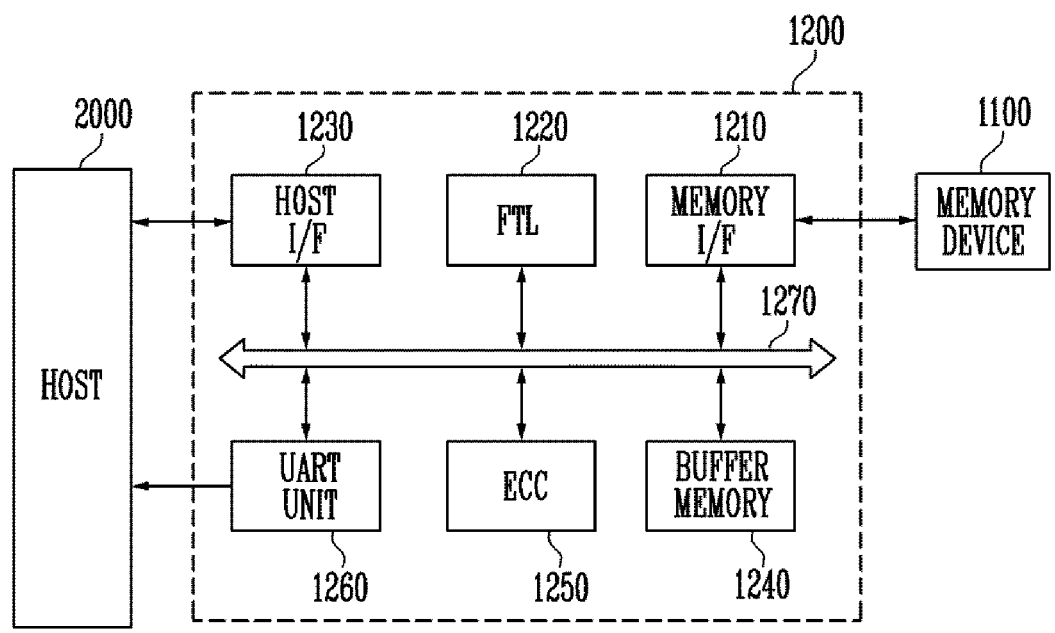
FIG. 2 is a diagram illustrating a memory controller of FIG. 1 according to an embodiment of the present disclosure.

FIG. 2 is a diagram illustrating the memory controller 1200 of FIG. 1 according to an embodiment of the present disclosure.

The memory controller 1200 controls communication between the host 2000 and the memory device 1100. Referring to FIG. 2, the memory controller 1200 may include a memory interface (I/F) 1210, a flash translation layer (FTL) 1220, a host I/F 1230, a buffer memory 1240, an error-correcting code unit (ECC) 1250, and a universal asynchronous receiver/transmitter unit (UART unit) 1260.

The memory I/F 1210 may be configured to communicate with the memory device 1100. The memory I/F 1210 may transmit and receive any of a command, an address, and data to and from the memory device 1100 through a channel.

The FTL 1220 may perform an operation of translating a logical address provided from the host 2000 into a physical address available in the memory device 1100, so that the memory device 1100 can efficiently use the physical address. The FTL 1220 may perform the above-described address translation operation using a mapping table (not shown). In an embodiment, the FTL 1220 may perform operations including garbage collection, wear leveling, reclaiming, and the like. For example, the FTL 1220 may perform garbage collection so as to secure a free block in the memory device 1100. The FTL 1220 may perform wear leveling so as to equalize program/erase cycles of a plurality of memory blocks of the memory device 1100. Also, the FTL 1220 may output output information in response to an output command received from the host 2000.

The host I/F 1230 may be configured to communicate with an external device, e.g., the host 2000 coupled to the memory system 1000. For example, the host I/F 1230 may receive a write command, a read command, data, and a logical address from the host 2000. Also, the host I/F 1230 may transmit data read from the memory device 1100 to the host 2000. Also, the host I/F 1230 may receive the output command from the host 2000 and transmit the output command to the FTL 1220.

The buffer memory 1240 may temporarily store data transmitted between the memory controller 1200 and the memory device 1100. For example, in a program operation, data to be programmed may be temporarily stored in the buffer memory 1240 before the data to be programmed is transmitted to the memory device 1100. At this time, the stored data may be re-used when the program operation fails in the memory device 1100. Also, in a read operation, data read from the memory device 1100 may be temporarily stored in the buffer memory 1240. For example, if data having a fixed capacity, which is read from the memory device 1100, is temporarily stored in the buffer memory 1240 in the read operation, the read data may be output to the host 2000 through the host I/F 1230.

The ECC 1250 is an error correction unit, and may detect and correct an error included in data read from the memory device 1100. For example, the ECC 1250 may perform an ECC encoding operation on data that is to be written into the memory device 1100. The data on which the ECC encoding operation has been performed may be transferred to the memory device 1100 through the memory I/F 1210. Also, the ECC 1250 may perform an ECC decoding operation on data that is received from the memory device 1100 through the memory I/F 1210. The ECC 1250 may perform an ECC operation based on any of a Bose-Chaudhuri-Hocquenghem code (BCH code), a Hamming code, and a low density parity check code (LDPC code). Also, the ECC 1250 may perform an ECC encoding operation or an ECC decoding operation based on data to be written into the buffer memory 1240.

The UART unit 1260 is a device that converts parallel data into serial data and transmits the converted serial data between the host 2000 and the memory device 1100. The UART unit 1260 may be compatible with communication standards such as any of EIA, RS-232, RS-422, and RS-485.

The memory I/F 1210, the FTL 1220, the host I/F 1230, the buffer memory 1240, the ECC 1250, and the UART unit 1260 may communicate with each other through a bus 1270.

Figure 3:
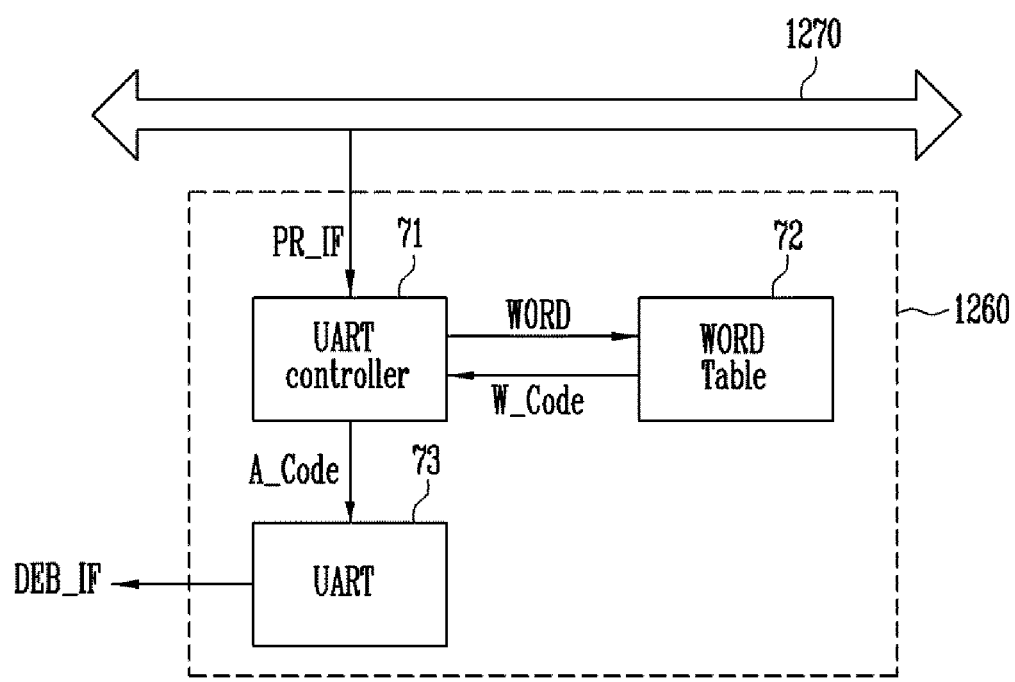
FIG. 3 is a diagram illustrating a universal asynchronous receiver/transmitter (UART) unit of FIG. 2 according to an embodiment of the present disclosure.

FIG. 3 is a diagram illustrating the UART unit 1260 of FIG. 2 according to an embodiment of the present disclosure.

Referring to FIG. 3, the UART unit 1260 may include a UART controller 71, a WORD table 72, and a UART 73.

If the UART controller 71 receives output information PR_IF through the bus 1270, the UART controller 71 may transmit text information WORD included in the output information PR_IF to the WORD table 72. The output information PR_IF may include various types of information. For example, the output information PR_IF may include information having different forms, such as a number, a word, or both. Here, when the text information WORD has the word form, the text information WORD may include information divided into units of words. In addition, the UART controller 71 may receive a word code W_Code from the WORD table 72, and generate an output code A_Code by combining the output information PR_IF and the word code W_Code. The generated output code A_Code may be transmitted to the UART 73.

The WORD table 72 may include a table including codes respectively corresponding to the text information WORD. For example, if the text information WORD is received from the UART controller 71, a word code W_Code corresponding to the received text information WORD may be extracted from the WORD table 72. To this end, the text information WORD and the word code W_Code are stored in the WORD table 72. The WORD table 72 may be stored in a volatile memory device or a nonvolatile memory device. For example, the WORD table 72 may be stored in a storage device in which the WORD table 72 cannot be changed once the WORD table 72 is stored, or may be stored in a storage device in which the WORD table 72 can be frequently updated.

The UART 73 may output debugging information DEB_IF based on the output code A_Code. The UART 73 may output the debugging information DEB_IF to the host 2000. For example, the UART 73 may translate the output code A_Code into an American Standard Code for Information Interchange (ASCII) code, and output the translated ASCII code as the debugging information DEB_IF. For example, when information such as a number is included in the output code A_Code in addition to a word, the UART 73 may translate the information corresponding to the number into an ASCII code. Also, the UART 73 may insert a space between codes having different forms such that the codes are distinguished from each other. For example, the UART 73 may insert a space between the number and the word code W_Code.

FIG. 4 is a diagram illustrating the WORD table 72 of FIG. 3 according to an embodiment of the present disclosure.

Referring to FIG. 4, the WORD table 72 may include text information WORD, which includes a plurality of words used in the UART 73, and word codes W_Code, which respectively correspond to the text information WORD. In an embodiment, if the UART controller 71 transmits text information WORD included in the output information PR_IF to the WORD table 72, the WORD table 72 may select a word code W_Code corresponding to the received text information WORD, and transmit the selected word code W_Code to the UART controller 71. For example, referring to FIG. 4, if the UART controller 71 transmits 'FOR' as the text information WORD to the WORD table 72, the WORD table 72 may select '01' as the word code W_Code.

The word code W_Code may be configured with a bit number that is smaller than a bit number of the text information WORD. For example, a word code W_Code of '01' may correspond to 'FOR' that is text information WORD, and a word code W_Code of '02' may correspond to 'OF' that is text information WORD.

In addition, word codes W_Code may correspond to combinations of frequently used words in addition to individual words. For example, a word code W_Code of '26' may be set with respect to a combination of a plurality of words such as 'NAND-CH3-DIE1.'

In addition to the above-described text information WORD and word codes W_Code, word codes W_Code may correspond to various words. In addition, sentence information may be stored as text information WORD, in addition to words. In this manner, the WORD table 72 may be configured such that word codes W_Code may respectively correspond to text information WORD, which may be in units of words and/or sentences.

The text information WORD may be stored as defaults in a manufacturing phase, or may be frequently updated by a user. If text information WORD is changed or updated, a word code W_Code corresponding to the text information WORD may be set.

Figure 5:
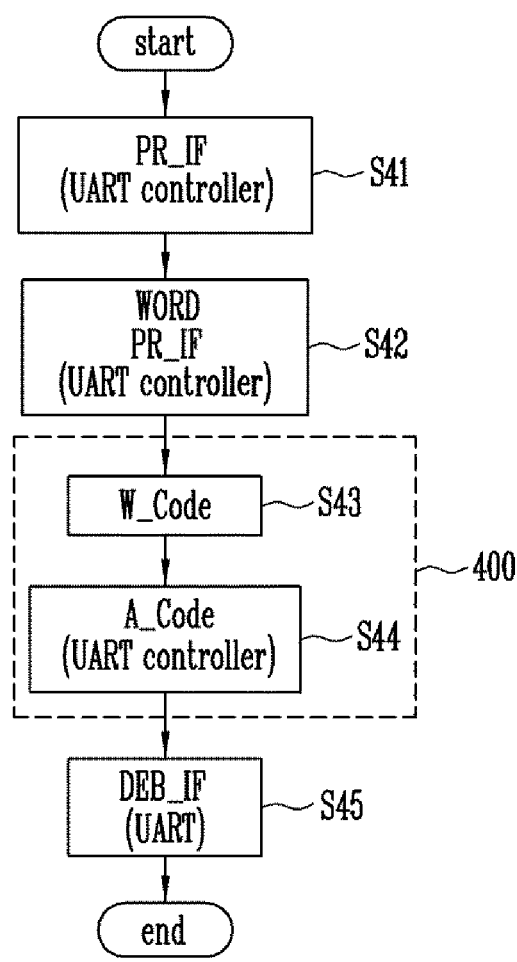
FIG. 5 is a flowchart illustrating an operating method of a UART unit according to an embodiment of the present disclosure.

FIG. 5 is a flowchart illustrating an operating method of the UART unit 1260 of FIG. 3 according to an embodiment of the present disclosure. The operating method of FIG. 5 will be described with reference to FIG. 3.

Referring to FIGS. 3 and 5, when output information PR_IF is transmitted to the UART controller 71 in response to an output command (S41), the UART controller 71 may extract text information WORD including a word or sentence from the received output information PR_IF, and may output the extracted text information WORD (S42). The output command may be a command received from the host 2000 of FIG. 2, and the memory controller 1200 of FIG. 2 may transmit the output information PR_IF to the UART controller 71 in response to the output command.

When the text information WORD including the word or sentence is extracted from the received output information PR_IF, a text translation operation 400 of replacing the word or sentence of the extracted text information WORD with a simple code may be performed. The text translation operation 400 may be performed using the WORD table 72 and the UART controller 71. For example, the WORD table 72 may output a word code W_Code corresponding to the text information WORD (S43). When the word code W_Code output from the WORD table 72 is transmitted to the UART controller 71, the UART controller 71 may generate an output code A_Code by combining the word code W_Code with other information in the output information PR_IF, and output the generated output code A_Code (S44). The other information is, for example, a complete or partial portion of the output information PR_IF that does not include the text information WORD. That is, in the text translation operation 400, the word or sentence of the text information WORD in the output information PR_IF is replaced with the simple code, and thus a bit number of data corresponding to the word or sentence among data included in the output information PR_IF may be decreased. When the bit number of data corresponding to the word or sentence is decreased, the speed at which the corresponding data is processed can be increased, and thus the performance of the memory controller 1200 can be improved.

If a plurality of words and sentences are included in the output information PR_IF, the UART controller 71 may sequentially output text information WORD corresponding to the plurality of words or sentences included in the output information PR_IF, and the WORD table 72 may sequentially output word codes W_Code in response to the sequentially received text information WORD. The UART controller 71 may allow the sequentially received word codes W_Code to be included at corresponding positions of the respective words extracted from the output information PR_IF, and generate an output code A_Code corresponding to the output information PR_IF in which the word codes W_Code are included instead of the plurality of words or sentences.

When the output code A_Code is transmitted to the UART 73, the UART 73 may output debugging information DEB_IF based on the output code A_Code (S45). For example, the UART 73 may translate the output code A_Code into an ASCII code and output the translated ASCII code as the debugging information DEB_IF.

Figure 6:
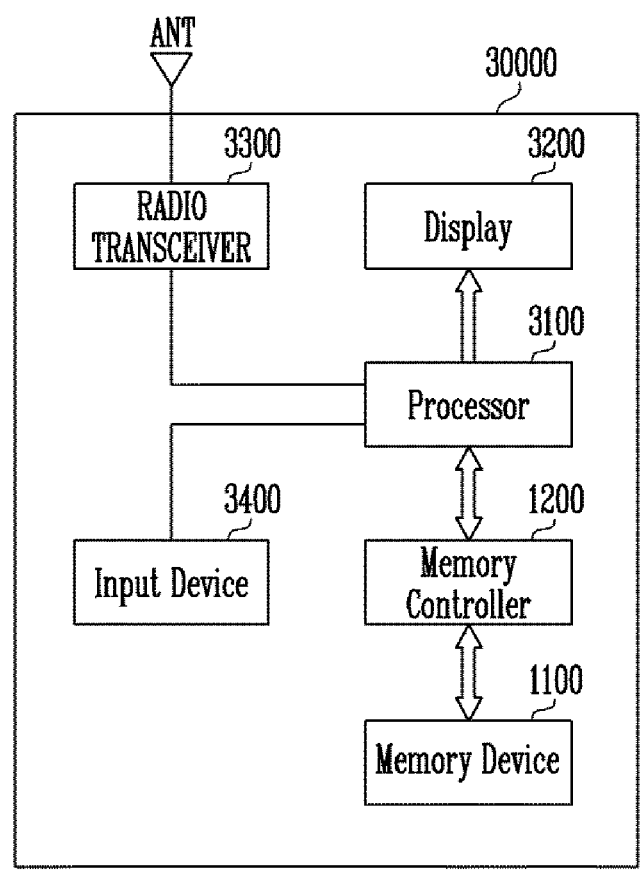
FIG. 6 is a diagram illustrating a memory system including the memory controller shown in FIG. 2 according to another embodiment of the present disclosure.

FIG. 6 is a diagram illustrating a memory system 30000 including the memory controller shown in FIG. 2 according to another embodiment of the present disclosure.

Referring to FIG. 6, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100. Also, the memory controller 1200 may include the UART unit 1260 as shown in FIG. 2.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process the signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT.

An input device 3400 is a device capable of inputting a control signal for controlling an operation of the processor 3100 or data to be processed by the processor 3100. The input device 3400 may be implemented with a pointing device such as a touch pad or a computer mouse, a keypad, or a keyboard. The processor 3100 may control an operation of the display 3200 such that the display 3200 outputs data output from the memory controller 1200, data output from the radio transceiver 3300, or data output from the input device 3400.

In some embodiments, the memory controller 1200 capable of controlling an operation of the memory device 1100 may be implemented as a part of the processor 3100, or may be implemented in a chip that is separate from the processor 3100.

Figure 7:
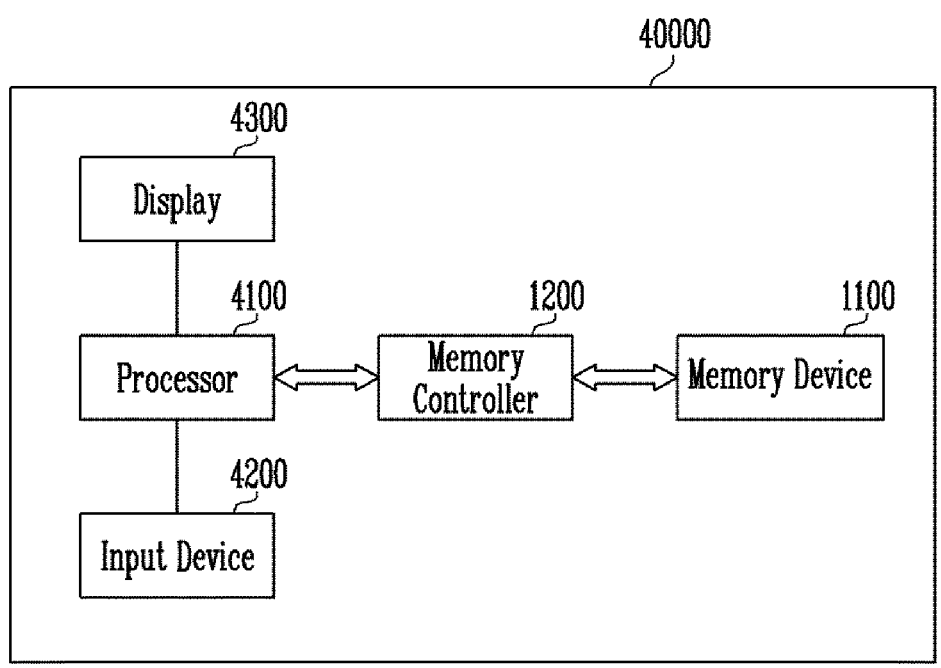
FIG. 7 is a diagram illustrating a memory system including the memory controller shown in FIG. 2 according to still another embodiment of the present disclosure.

FIG. 7 is a diagram illustrating a memory system 40000 including the memory controller shown in FIG. 2 according to still another embodiment of the present disclosure.

Referring to FIG. 7, the memory system 40000 may be implemented as a personal computer (PC), a tablet PC, a net-book, an e-reader, a personal digital assistant (PDA), a portable multimedia player (PMP), an MP3 player, an MP4 player, or the like.

The memory system 40000 may include a memory device 1100 and a memory controller 1200 capable of controlling a data processing operation of the memory device 1100. The memory controller 1200 may include the UART unit 1260 as shown in FIG. 2.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented in a separate chip from the processor 4100.

Figure 8:
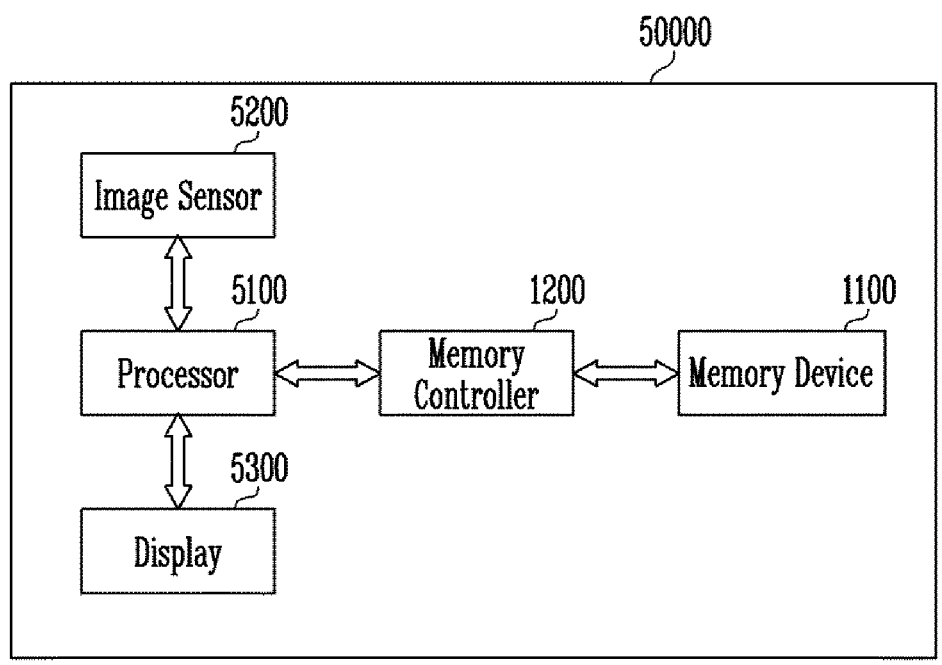
FIG. 8 is a diagram illustrating a memory system including the memory controller shown in FIG. 2 according to further still another embodiment of the present disclosure.

FIG. 8 is a diagram illustrating a memory system 50000 including the memory controller shown in FIG. 2 according to further still another embodiment of the present disclosure.

Referring to FIG. 8, the memory system 50000 may be implemented as an image processing device, e.g., a digital camera, a mobile terminal including a digital camera attached thereto, a smart phone including a digital camera attached thereto, or a tablet PC including a digital camera attached thereto.

The memory system 50000 may include a memory device 1100 and a memory controller 1200 capable of controlling a data processing operation of the memory device 1100, e.g., a program operation, an erase operation, or a read operation. The memory controller 1200 may include the UART unit 1260 as shown in FIG. 2.

An image sensor 5200 of the memory system 50000 may convert an optical image into digital signals, and the digital signals may be transmitted to a processor 5100 or the memory controller 1200. Under the control of the processor 5100, the digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented in a chip that is separate from the processor 5100.

Figure 9:
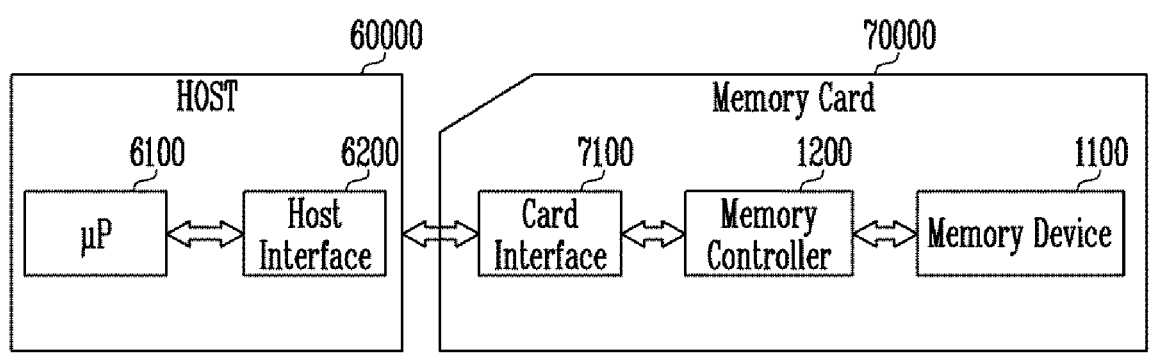
FIG. 9 is a diagram illustrating a memory system including the memory controller shown in FIG. 2 according to further still another embodiment of the present disclosure.

FIG. 9 is a diagram illustrating a memory system 70000 including the memory controller shown in FIG. 2 according to further still another embodiment of the present disclosure.

Referring to FIG. 9, the memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may include a secure digital (SD) card interface or a multi-media card (MMC) interface, but the present disclosure is not limited thereto. The memory controller 1200 may include the UART unit 1260 as shown in FIG. 2.

The card interface 7100 may perform data exchange between a host 60000 and the memory controller 1200 according to a protocol of the host 60000. In some embodiments, the card interface 7100 may support a universal serial bus (USB) protocol and an inter-chip (IC)-USB protocol. Here, the card interface 7100 may include hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor (µP) 6100 of the host 60000.

According to the present disclosure, the communication speed of a universal asynchronous receiver/transmitter (UART) unit including a universal asynchronous receiver/transmitter (UART) can be improved. Accordingly, the performance of a memory system can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A universal asynchronous receiver/transmitter (UART) unit comprising:
   a UART controller configured to receive output information including first and second information, extract the first information from the output information, obtain one or more word codes corresponding to the first information, and generate an output code by combining the one or more word codes with the second information, the first information being one or more words;
   a UART configured to output debugging information based on the output code; and
   a WORD table configured to store text information including a plurality of words and a plurality of word codes corresponding to the text information, and output the one or more word codes corresponding to the one or more words when the one or more words are provided from the UART controller,
   wherein the UART controller is configured to:
      when the output information is provided, extract the one or more words included in the output information and output the one or more words to the WORD table; and
      when the one or more word codes are provided from the WORD table, output the output code to the UART by combining the one or more word codes with the second information.

2. The UART unit of claim 1, wherein the text information is divided into units of words, groups of words, units of sentences, or a combination thereof.

3. The UART unit of claim 1, wherein a word code has a smaller bit number than a bit number of a corresponding word.

4. The UART unit of claim 1, wherein, when the first information is a multiplicity of words, the UART controller sequentially outputs the multiplicity of words to the WORD table.

5. The UART unit of claim 4, wherein the WORD table sequentially outputs, to the UART controller, word codes respectively corresponding to the multiplicity of words.

6. The UART unit of claim 5, wherein the UART controller includes the word codes sequentially received from the WORD table at positions of the multiplicity of words in the output information instead of the multiplicity of words, and generates the output code corresponding to the output information in which the word codes are included.

7. The UART unit of claim 1, wherein the UART translates the output code into an American Standard Code for Information Interchange (ASCII) code and outputs the translated ASCII code as the debugging information.

8. The UART unit of claim 7, wherein the UART generates the debugging information by inserting a space between codes having different forms in the output code.

9. A memory controller comprising:
   a host interface configured to receive an output command from a host;
   a flash translation layer (FTL) configured to provide output information in response to the output command, the output information including first and second information, the first information being one or more words; and
   a UART unit configured to receive the output information, store a plurality of word codes corresponding to a plurality of words, extract the first information from the output information, obtain one or more word codes corresponding to the first information among the plurality of word codes, generate an output code by combining the one or more word codes with the second information, and generate debugging information using the output code,
   wherein the UART unit includes:
      a WORD table configured to store text information including the plurality of words and the plurality of word codes corresponding to the text information;
      a UART controller configured to extract the one or more words from the output information, output the extracted one or more words to the WORD table, and generate the output code by combining the second information with the one or more word codes output from the WORD table; and
      a UART configured to output the debugging information using the output code.

10. The memory controller of claim 9, wherein a word code has a smaller bit number than a bit number of a corresponding word.

11. The memory controller of claim 9, wherein the UART controller includes the one or more word codes received from the WORD table at positions of the one or more words in the output information instead of the extracted one or more words, and generates the output code corresponding to the output information in which the one or more word codes are included.

12. The memory controller of claim 9, wherein the UART translates the output code into an ASCII code and outputs the translated ASCII code as the debugging information.

13. The memory controller of claim 12, wherein the UART generates the debugging information by inserting a space between codes having different forms in the output code.

14. A memory system comprising:
a memory device configured to store data; and
a memory controller configured to control the memory device in response to a request of a host, and output debugging information of output information in response to an output command received from the host, the output information including first and second information, the first information being one or more words,
wherein the memory controller includes text information including a plurality of words and a plurality of word codes corresponding to the text information, and outputs the debugging information by extracting the first information from the output information, obtaining one or more word codes corresponding to the first information from the plurality of word codes, and combining the one or more word codes with the second information in response to the output command,
wherein the memory controller includes:
a WORD table configured to store the plurality of words of the text information and the plurality of word codes corresponding to the plurality of words;
a UART controller configured to extract the one or more words from the output information, output, to the WORD table, the extracted one or more words, receive the one or more word codes from the WORD table, and generate an output code by combining the one or more word codes with the second information; and
a UART configured to output the debugging information using the output code.

15. The memory system of claim 14, wherein the memory controller further includes:
an FTL configured to output the output information in response to the output command.

16. The memory system of claim 14, wherein a word code has a smaller bit number than a bit number of a corresponding word.

* * * * *